United States Patent [19]

Kodama

[11] 4,329,720
[45] May 11, 1982

[54] CASSETTE TAPE RECORDER WITH STOP MECHANISM WHICH DETECTS THE STOP OF A TAPE RUN

[75] Inventor: Hisao Kodama, Yokohama, Japan

[73] Assignee: Tokyo Shibaura Denki Kabushiki Kaisha, Japan

[21] Appl. No.: 125,921

[22] Filed: Feb. 29, 1980

[30] Foreign Application Priority Data

Mar. 5, 1979 [JP] Japan .................................. 54/25444
Mar. 5, 1979 [JP] Japan .................................. 54/27757
Mar. 5, 1979 [JP] Japan .................................. 54/27758

[51] Int. Cl.³ ....................... G11B 15/44; G11B 19/26
[52] U.S. Cl. .................................. 360/74.3; 242/206; 360/72.3; 360/137
[58] Field of Search ....................... 360/74.3, 74.1–74.2, 360/72.3, 96.1, 96.3–96.4, 93; 242/197–200, 206

[56] References Cited

U.S. PATENT DOCUMENTS

| | | | |
|---|---|---|---|
| 4,018,404 | 4/1977 | Sami | 360/137 |
| 4,033,491 | 7/1977 | Aldenhoven | 360/137 |
| 4,115,822 | 9/1978 | Kitazawa et al. | 360/74.2 |
| 4,170,789 | 10/1979 | Inoue | 360/74.1 |
| 4,172,266 | 10/1979 | Onishi et al. | 360/72.3 |
| 4,175,273 | 11/1979 | Nakamura | 360/137 |
| 4,227,223 | 10/1980 | Magata et al. | 360/74.1 |

FOREIGN PATENT DOCUMENTS 52-11212 3/1977 Japan .
54-40809 11/1979 Japan .

Primary Examiner—Alfred H. Eddleman
Attorney, Agent, or Firm—Finnegan, Henderson, Farabow, Garrett & Dunner

[57] ABSTRACT

A tape recorder comprises a tape run stop detection lever and a spring. The lever is provided with a detection pin which is urged in one direction by a rotation of a right side reel rest to be engaged with a cam idler. When the detection pin is engaged with the cam idler at the stop of the right side reel rest, the lever is moved in one direction by the engagement between the cam idler and detection pin. The spring produces at the movement of the lever an urging force acting in the direction opposite to said one direction. The lever is moved in the direction by the engagement between the cam idler and detection pin to detect the stop of the tape run. The cam idler is temporarily prevented from being coupled to an idler section of a flywheel and is rotated by the spring in the direction opposite to said one direction to release the engagement.

24 Claims, 24 Drawing Figures

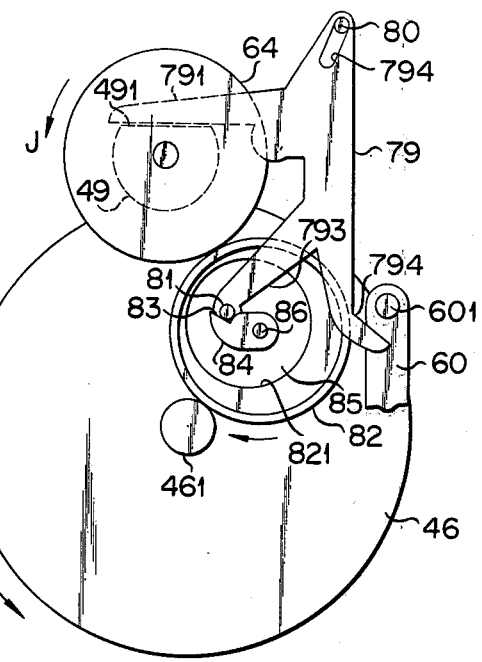
F I G. 12
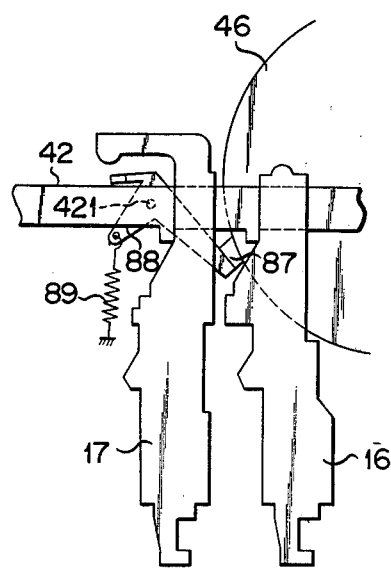
F I G. 14A
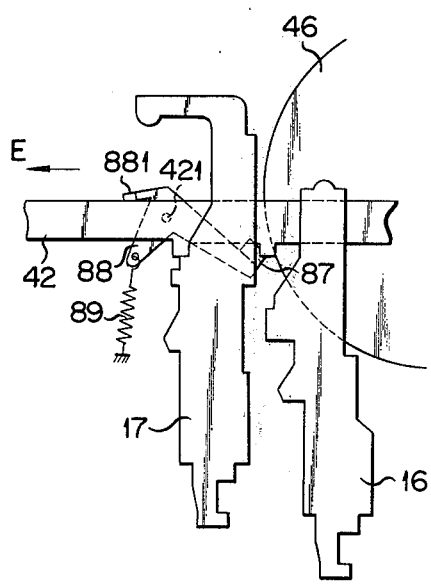
F I G. 14B

CASSETTE TAPE RECORDER WITH STOP MECHANISM WHICH DETECTS THE STOP OF A TAPE RUN

This invention relates to a cassette tape recorder and more particularly to a cassette tape recorder provided with an automatic stop mechanism which detects the stop of a tape run and reliably brings the operation of the tape recorder to rest.

In recent years, development is widely carried out to manufacture, for example, a cassette tape recorder with light weight and at low cost by molding a chassis and various mechanical parts mounted thereon from plastics material.

A cassette tape recorder thus developed has the advantages of not only attaining the above-mentioned object but also facilitating the fabrication of a chassis and various mechanical parts mounted thereon and absorbing shocks and vibrations occurring particularly in the actuation of the operation members of a cassette tape recorder.

What is demanded for a cassette tape recorder thus developed is that the various mechanical parts should be smoothly actuated. A particularly strong demand is made to develop an automatic tape run stop mechanism for a cassette tape recorder which unfailingly detects the stop of a tape run, and reliably suspends the actuation of the cassette tape recorder without obstructing the function of any other operation mode members.

This invention has been accomplished in view of the above-mentioned circumstances, and is intended to provide a cassette tape recorder provided with a mechanism which reliably detects the stop of a tape run and automatically brings the operation of the cassette tape recorder to rest without fail.

According to an aspect of the present invention, there is provided a cassette tape recorder which comprises:
a motor;
operation means moved between an operation position and a non-operation position;
a first rotating member rotated by the motor for effecting the run of a tape, when the operation means is locked in the operation position;
a second rotary member brought to rest when the run of the tape is stopped;
a third rotary member coupled to the first rotary member for rotation when the operation means moves to the operation position;
a tape run stop detection mechanism for detecting the stop of the tape run and taking an action corresponding to said detection;
a release mechanism for unlocking the operation means from the operation position state when the tape run stop detection means takes said action;
an interruption mechanism for temporarily disengaging the third rotary member from the first rotary member in response to the action of said release mechanism, the improvement in which
the third rotary member comprises an engagement section rotatable therewith;
the tape run stop detection mechanism comprises a movable member provided with an engagement member which is urged in one direction by the rotation of the second rotary member to be engage with said engagement section, the engagement member being engaged with said engagement section at the stop of the second rotary member, said movable member being moved in the direction resulting from the engagement between said engagement member and engagement section, and an urging member for producing at the movement of said movable member an urging force acting in a direction opposite to that which results from said engagement between said engagement member and engagement section;

the movable member is moved in the direction resulting from said engagement between said engagement member and engagement section to detect the stop of the tape run; and the third rotary member is temporarily prevented from being coupled to the first rotary member and is rotated by the urging member in a direction opposite to that which results from said engagement between said engagement member and engagement section to release said engagement.

This invention can be more fully understood from the following detailed description when taken in conjunction with the accompanying drawings, in which:

FIG. 12 is a top view of an automatic stop mechanism according to another embodiment of this invention;

FIGS. 14A and 14B are top views setting forth the arrangement of a brake mechanism of the cassette tape recorder.

A cassette tape recorder embodying this invention will now be detailed with reference to the accompanying drawings.

Figure 1:
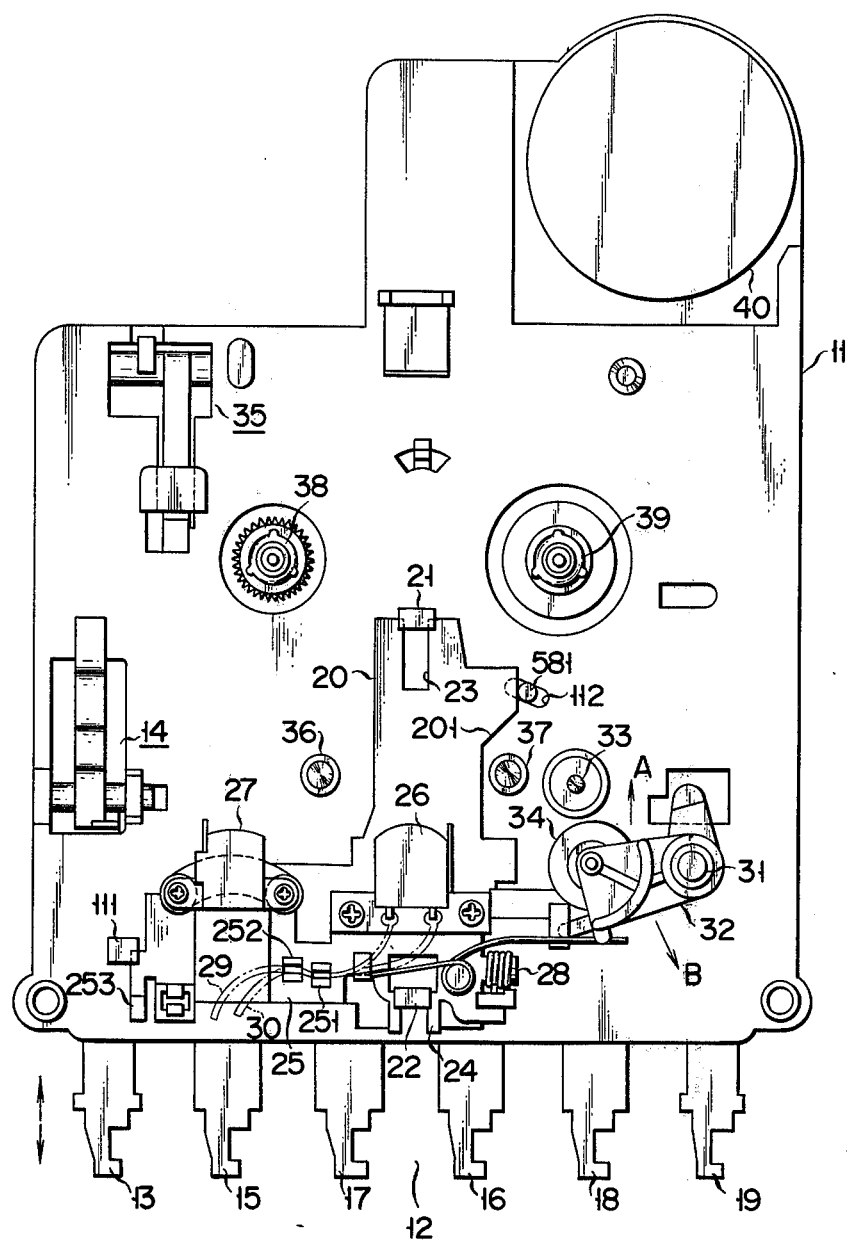
FIG. 1 is a top view of a cassette tape recorder embodying this invention.

FIG. 1 shows the fundamental arrangement of a cassette tape recorder embodying the invention. Reference numeral 11 denotes a main chassis of the cassette tape recorder, which is prepared from synthetic resin. An assembly 12 of a plurality of operation members 13, 15, 16, 17, 18, 19 for setting the cassette tape recorder for a prescribed operation mode or stop mode is provided ahead of the main chassis 11 (at the lower part of FIG. 1) in a state reciprocative in the direction of arrow indicated in FIG. 1. Among the assembly 12 of the operation member, reference numeral 13 denotes a stop-eject member. When this stop-eject member 13 is actuated, a prescribed operation mode of the cassette tape recorder is stopped, or an eject mechanism 14 (not shown) for taking a tape cassette out of the tape recorder is actuated. Reference numeral 15 shows a record member. When this record member 15 is actuated, an approximately L-shaped protuberance 151 (FIG. 2) formed on one lateral wall of said member 15 causes the reproducing member 16 to be jointly operated. Reference numeral 17 indicates a rewinding member, and reference numeral 18 represents a fast forwarding member. Reference numeral 19 shows a pause mode member for temporarily stopping the recording or reproducing mode.

A metal head chassis 20 (FIG. 1) is mounted on the main chassis 11. Formed in the head chassis 20 are notches 23, 24 (FIG. 1) engageable with engagement projections 21, 22 integrally formed with the main chassis 11. The head chassis 20 slides jointly with the actuation of the reproducing member 16 in the same direction as that in which said reproducing member 16 is operated. An attaching member 25 prepared from synthetic resin is attached to a prescribed portion of the head chassis 20. A recording and reproducing head 26, eraser head 27 and spring 28 are mounted on the attaching member 25 in the prescribed positions. The spring 28 causes the head chassis 20 and reproducing member 16 to be jointly actuated. Two elastic bifurcate clamping members 251, 252 are erected on the surface of the attaching member 25 in a mutually facing relationship relative to the plane of the head chassis 20. The clamping members 251, 252 clamp leads 29, 30 extending from the recording and reproducing head 26.

A thin elastic attachment 253 is formed at the left side end (FIG. 1) of the attaching member 25. An engagement attachment 111 engageable with the elastic attachment 253 is integrally formed with the main chassis 11. The recording-reproducing head 26 is connected to a recording-reproducing circuit (not shown) by means of leads 29, 30 indicated in two dots-dash lines. A pinch lever 32 prepared from synthetic resin is formed on the right side (FIG. 1) of the head chassis 20. This pinch lever 32 can be rotated in the directions of arrows A, B indicated in FIG. 1 about a pivotal shaft 31 in response to the slide of the head chassis 20. A pinch roller 34 is provided at one end of the pinch lever 32. When the pinch lever 32 is rotated in the direction of the arrow A, the pinch roller 34 is pressed against a capstan 33 coaxially set with the later described flywheel 46 (FIG. 2).

An erroneous erase-preventing mechanism 35 prepared from synthetic resin is provided in the rear part (the upper part of FIG. 1) of the main chassis 11. This erroneous erase-preventing mechanism 35 detects the presence or absence of an erroneous erase-preventing pawl in the tape cassette. Said erroneous erase-preventing mechanism 35 actuates the recording member 15 at the detection of the presence of said pawl and unactuates the recording member 15 at the detection of the absence of said pawl.

Referring to FIG. 1, reference numerals 36, 37 denote guide pins. Reference numerals 38, 39 show the left and right reel rests. Reference numeral 40 indicates a motor.

Figure 2:
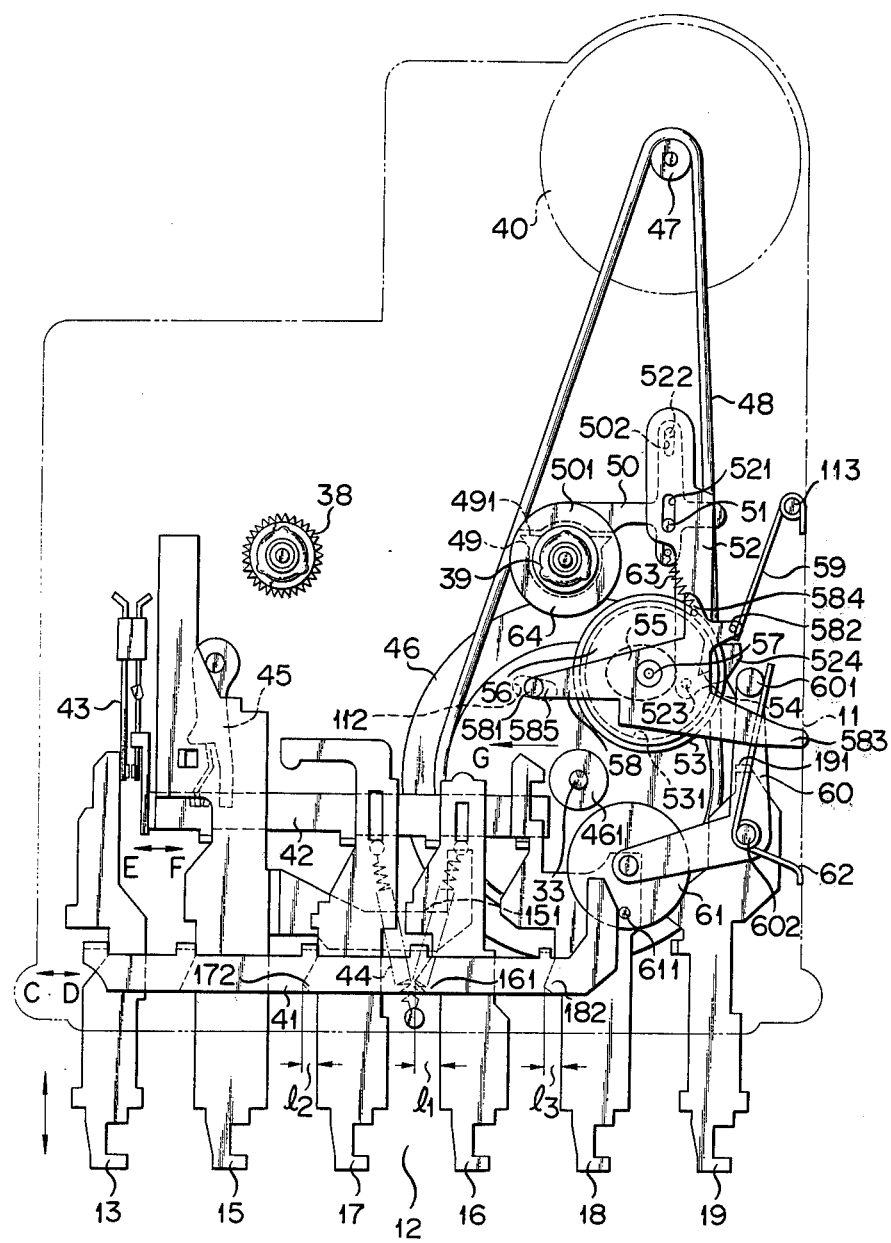
FIG. 2 is a top view of the interior of the cassette tape recorder of FIG. 1.

FIG. 2 schematically sets forth the arrangement of the various mechanisms mounted on the underside of the main chassis 11 of the cassette tape recorder shown in FIG. 1. The recording member 15, reproducing member 16, rewinding member 17 and fast forwarding member 18 are locked in an actuated position by a lock board 41 which is provided substantially at right angles to these operation members and reciprocates in the direction of arrows C, D indicated in FIG. 2 in engagement with said operation members. Further, a switch slider 42 is provided substantially parallel with the lock board 41. This switch slider 42 can slide in the directions of arrows E, F indicated in FIG. 2 in engagement with said operation members. When the switch slider 42 is moved in the direction of the arrow E, then a power supply switch 43 for the motor 40 is rendered electrically conducting.

The reproducing member 16 and rewinding member 17 are urged to the front part of the tape recorder by a coil spring 44 bent substantially in the V-shape. An erroneous record-preventing mechanism 45 prepared from synthetic resin is provided substantially at the midpoint of the recording member 15. When any of the other operation members, such as the reproducing member 16, rewinding member 17, fast forwarding member 18 is actuated in advance, said recording member 15 is unactuated by the erroneous record-preventing mechanism 45.

Reference numeral 46 of FIG. 2 shows a flywheel. This flywheel 46 is coupled to the motor 40 by means of a motor pulley 47 and a belt 48 to transmit the rotation moment of the motor 40 to a selected operation member.

There will now be described the function of an automatic stop mechanism embodying this invention which is provided for a cassette tape recorder having the above-mentioned fundamental arrangement.

Figure 3:
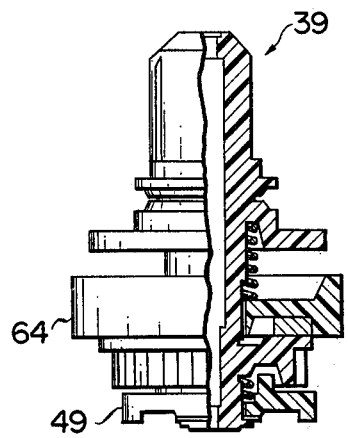
FIG. 3 is a front view, partly in section, of a right side reel rest.

As shown in FIGS. 2 and 3, a friction board 49 having an approximately semicircular shape is set at the lower end of the right side reel rest 39. This friction board 49 is frictionally engaged with the right side reel rest 39. The friction board 49 is rotated in the same direction as that in which the right side reel rest 39 is rotated. Where the rotation of the friction board 49 is obstructed by a greater force than prescribed, then a slip arises between the right side reel rest 39 and the friction board 49 regardless of the rotation of the right side reel rest 39, thereby stopping the rotation of the friction board 49.

As seen from FIG. 2, the friction board 49 comprises a straight plane 491 formed by cutting off part of said friction board 49 approximately in the semicircular form. An engagement section 501 of a swingable lever 50 extends toward the neighborhood of the straight plane 491 of the friction board 49, in a state engageable with said straight plane 491, as need arises. The swingable lever 50 is formed substantially into the cross shape. At the junction of both arm sections of said cross-shaped swingable lever 50, the swingable lever 50 is rotatably supported by a pivotal pin 51, which protrudes downward from the main chassis 11, positioned on the right side of the right side reel rest 39. An elongate hole 502 extending lengthwise of the cassette tape recorder is formed in the rear part (the upper part of FIG. 2) of the cross-shaped swingable lever 50.

A tape run stop detection lever 52 is set on the engagement section 501 of the swingable lever 50 approximately at right angles. This tape run stop detection lever 52 is provided with an elongate hole 502 extending lengthwise of the tape recorder, that is, toward the junction of both arm sections of the cross-shaped swingable lever 50.

The tape run stop detection lever 52 is mounted on the swingable lever 50 in a state intersecting the engagement section 501 of said lever 50 at right angles. The tape run stop detection lever 52 is provided with an elongate hole 521 formed near the junction of both arms of the cross-shaped swingable lever 50 and extended lengthwise of the tape recorder and also with a pin 522 protruding downward from the rear end of said detection lever 52. Fitted into the elongate hole 521 is the pivotal pin 51 which is erected on the main chassis 11 to rotatably support the cross-shaped swingable lever 50. The pin 522 formed on the tape run stop detection lever 52 is fitted into the elongate hole 502 formed in the cross-shaped swingable lever 50. Stretched between the detection lever 52 and swingable lever 50 is a spring 63 which urges the detection lever 52 upward. The detection lever 52 is securely set in place with the lower end wall of the elongate hole 521 of said detection lever 52 pressed against the pivotal pin 51. Therefore, the tape run stop detection lever 52 is interlockingly rotated with the swingable lever 50 in the same direction. The later described tape run stop detection pin 523 is erected at the forward end of said detection lever 52.

Figure 7:
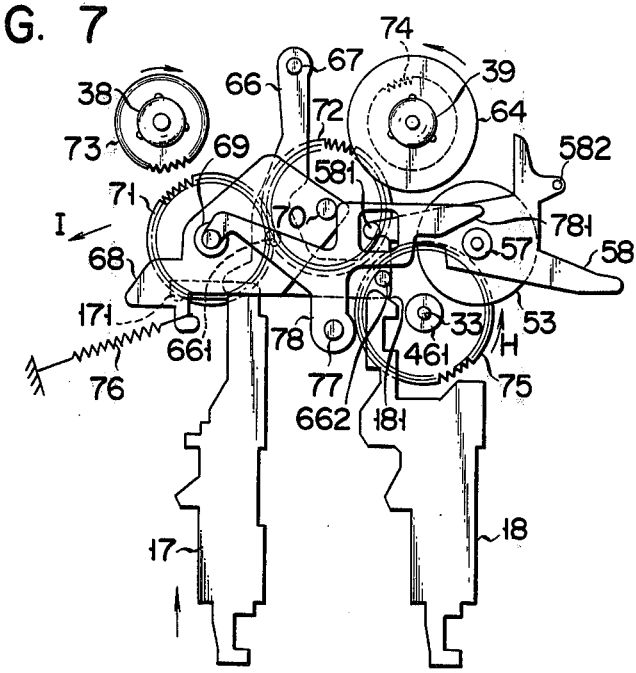
FIG. 7 is a top view of the automatic stop mechanism of FIG. 4 at the fast forward and rewind modes.

Mounted on the surface of the forward end portion of the detection lever 52 are a circular disc-shaped cam idler 53 and a changeover lever 58 for rotatably supporting said cam idler 53 in a superposed relationship as counted from said detection lever 52. The changeover lever 58 comprises three arms 584, 585, 583 projecting toward the rear side, left side and right side respectively of said changeover lever 58. The rearward projecting arm 584 is slidably supported by a bent engagement attachment (not shown) protruding from the main chassis 11. The rightward projecting arm 583 is loosely fitted into a hole (not shown) opened in the right side lateral wall of the main chassis 11. The underside of the leftward projecting arm 585 is supporting by a fast forward member 66 (FIG. 7). Therefore, the changeover lever 58 is movably mounted on the main chassis 11. A downward projecting pin 582 is provided near the rearward projecting arm 584 of the changeover lever 58. An upward projecting pin 581 is disposed near the leftward projecting arm 585 of said changeover lever 58. The upward projecting pin 581 is loosely fitted into the later described elongate hole 112 which is formed on the main chassis 11. One end of a torsion spring 59 whose intermediate part is wound about a pin 113 formed on the main chassis 11 is pressed against the pin 582. The other end of said torsion spring 59 is pressed against the right side lateral wall of the main chassis 11. Therefore, the changeover lever 58 is normally urged in the direction of an arrow G indicated in FIG. 2. The upward projecting pin 581 abuts against the right side lateral wall of the head chassis 20, thereby securely setting the changeover lever 58 in position (FIG. 1).

Figure 5A:
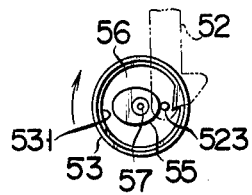
FIGS. 5A, 5B and 5C are schematic top views illustrating the actuated state of the rotary cam of the automatic stop mechanism of FIG. 4.
Figure 5B:
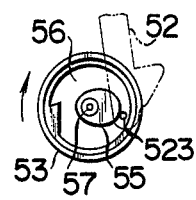
Figure 5C:
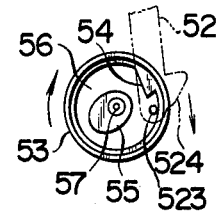

Cut out in the underside of the circular disc-shaped cam idler 53 is a cavity 56 into which the detection pin 523 of the tape run stop detection lever 52 is loosely fitted. As seen from FIGS. 5A, 5B and 5C, the cavity 56 is defined by the inner wall 531 of the peripheral edge of said circular cam idler 53 formed concentrically with the pivotal shaft 57 thereof and the outer peripheral wall of an approximately circular rotary cam 55 set in a state surrounded by the inner wall of said peripheral edge of the circular cam idler 53 in an eccentrical relationship relative to the pivotal shaft 57 of the circular cam idler 53. Formed on the inner wall of the peripheral edge of the circular cam idler 53 is an engagement section 54 protruding toward the interior of the cam idler 53. The rotary cam 55 is eccentrically displaced from the pivotal shaft 57 of the cam idler 53 on the opposite side of said pivotal shaft 57 to that on which the projecting engagement section 54 is provided. The approximately circular rotary cam 55 has such a shape that where the pin 523 pressed against the outer peripheral wall of the rotary cam 55 is brought nearest to the pivotal shaft 57 of the circular cam idler 53, then said pin 523 falls outside of a locus traced by the pointed section of the engagement section 54 (see FIG. 5A). Where the pin 523 pressed against the outer peripheral wall of the rotary cam 55 is carried to a point remotest from the pivotal shaft 57 of the circular cam idler 53, then said pin 523 falls on a locus traced by the pointed section of the engagement section 54.

An inclined section 524 is formed near the forward end of the tape run stop detection lever 52 at which the detection pin 523 is provided. Where said detection lever 52 is moved forward (that is, to the lower part of FIG. 2), then said inclined section 524 is engaged with an engagement protuberance 601 formed at the rear end of an automatic tape run stop lever 60. This automatic tape run stop lever 60 is rotatably mounted on that part of the main chassis 11 which focus said inclined section 524. This automatic tape run stop lever 60 is formed substantially in the L-shape, and rotatably supported by a pivotal shaft 602 provided at the angular section. The forward end of said L-shaped automatic tape run stop lever 60 rotatably supports a drive idler 61. The L-shaped automatic tape run stop lever 60 is urged by a torsion spring 62 to be rotated counterclockwise of FIG. 2. One arm of this torsion spring 62 is wound about the pivotal shaft 602 at the base, and is engaged with the engagement protuberance 601 at the end. The other arm of said torsion spring 62 is also wound about the pivotal shaft 602 at the base and engaged with the right side lateral wall of the main chassis 11. An upward projecting pin (not shown) mounted on the automatic tape run stop lever 60 is pressed against the inner wall of an opening (not shown) formed in the main chassis 11, thereby securely setting said automatic tape run stop lever 60 in place. The drive idler 61 is provided with an engagement pin 611 for striking the right side end of the lock board 41. When rotated clockwise of FIG. 2 against the urging force of the torsion spring 62, the automatic stop lever 60 causes the drive idler 61 to be pressed against the idler section 461 of the flywheel 46.

The operation of the automatic stop mechanism arranged as described above is now described.

Figure 4:
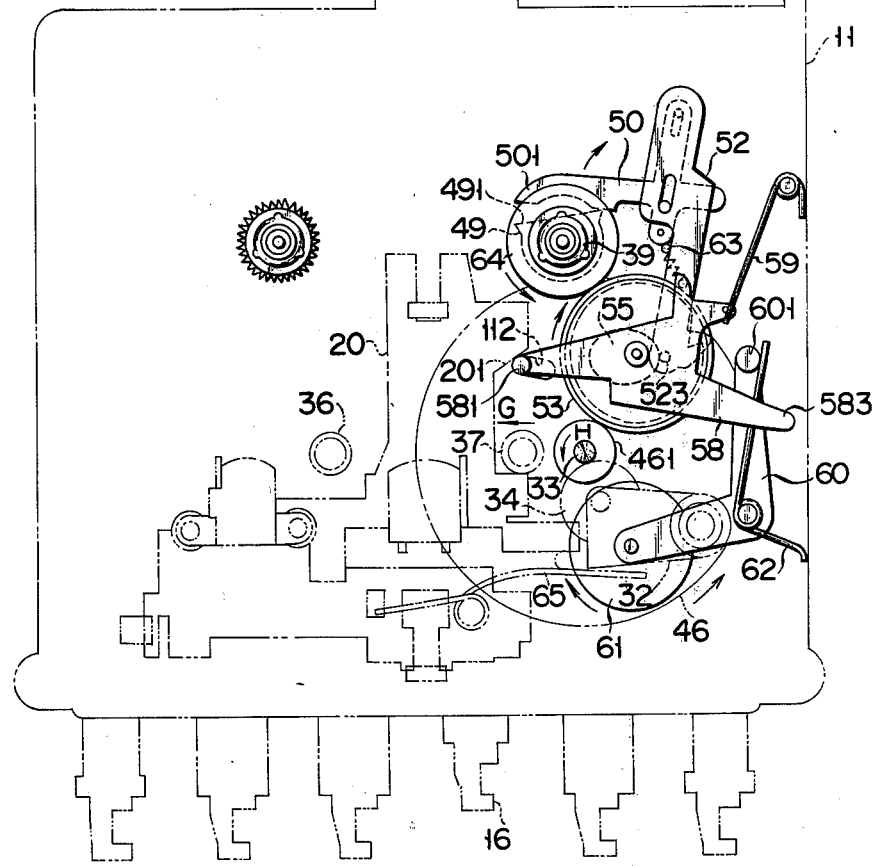
FIG. 4 is a top view of an automatic stop mechanism of the cassette tape recorder.

Reference is first made to a mechanism for automatically stopping a tape run to effect the reproducing or recording mode. Where the reproducing member 16 is pushed into the rear part (the upper part of FIG. 2) of a cassette tape recorder for actuation, then the head chassis 20 jointly slides in the same direction as shown in FIG. 4. At this time, the engagement pin 581 of the changeover lever 58 is pressed against the right side wall of the head chassis 20 due to the urging force of the torsion spring 59. At the movement of the head chassis 20, however, the engagement pin 581 abuts against an inclined section 201 formed on the right side of the head chassis 20. Therefore, said engagement pin 581 slides substantially in the direction of an arrow G indicated in FIG. 4 by being guided through an elongate hole 112 formed in the main chassis 11 so as to extend crosswise thereof. The slide of the engagement pin 581 in the direction of the arrow G causes the cam idler 53 fitted to the changeover lever 58 to be moved in the same direction. As a result, said cam idler 53 is pressed against an idler 64 (FIG. 3) frictionally engaged with the underside of the right side reel rest 39 and the idler section 461 of the flywheel 46. Where the reproducing member 16 is actuated, and the power supply switch 43 is rendered conducting, the motor 40 is driven. Accordingly, the flywheel 46 is rotated in the direction of an arrow H indicated in FIG. 4 (that is, counterclockwise of FIG. 4). At this time, the cam idler 53 abutting against the idler section 461 of the flywheel 46 is rotated clockwise of FIG. 4, causing the idler 64 and right side reel rest 39 to be rotated counterclockwise. Though, at this time, the friction board 49 tends to be rotated in the same direction (that is, counterclockwise of FIG. 4) as the right side reel rest 39, yet the right side end of the flat section 491 of the friction board 49 is pressed against the engagement section 501 of the cross-shaped swingable lever 50, causing this swingable lever 50 to be so urged as to be rotated clockwise of FIG. 4 about the pivotal pin 51. As a result, the tape run stop detection lever 52 is also urged to be rotated in the same direction, causing the tape run stop detection pin 523 to be normally pressed against the peripheral surface of the rotary cam 55.

Where the reproducing member 16 is actuated and the head chassis 20 is moved, then the pinch lever 32 is rotated clockwise of FIG. 4 by the urging force of the torsion spring 65 fitted to the head chassis 20. As a result, the pinch roller 34 abuts against the capstan 33 with a magnetic tape interposed therebetween.

Where the reproducing mode is stably carried out as is generally the case, then the detection pin 523 of the tape run stop detection lever 52 is pressed against the peripheral surface of the rotary cam 55. Even when, the cam idler 53 is rotated, the tape run stop detection pin 523 still remains pressed against the peripheral surface of the rotary cam 55. Therefore, the conditions expressed as FIG. 5A→FIG. 5B→FIG. 5A→FIG. 5B ... are repeated. In other words, the tape run stop detection pin 523 sustains a state disengaged from the engagement section 54. The right side reel rest 39 is rotated by frictional engagement with the idler 64 to which a drive power is transmitted. Where, therefore, under the above-mentioned condition, the cassette tape runs to the terminal end and is brought to rest, then said right side reel rest 39 ceases to be rotated. At the stop of the rotation of the right side reel rest 39, the friction board 49 also ceases to be rotated. Therefore, the cross-shaped swingable lever 50 and tape run stop detection lever 52 are released from a rotation moment produced by the rotation of the friction board 49. As a result, the tape run stop detection pin 523 ceases to be pressed against the peripheral surface of the rotary cam 55. At this time, however, the motor still remains driven, causing the flywheel 46 and cam idler 53 to be rotated. Once, therefore, brought to a position indicated in FIG. 5B, the detection pin 523 of the tape run stop detection lever 52 retains said position showing in FIG. 5B, instead of being shifted to a position shown in FIG. 5a, and consequently remains pressed against that part of the peripheral surface of the rotary cam 55, which is remotest from the pivotal shaft 57 of said cam 55. Where the engagement section 54 of the rotating cam idler 53 is drawn near to the detection pin 523, then the detection pin 523 which is pressed against the above-mentioned remotest part of the peripheral surface of the rotary cam 55 from the pivotal shaft 57 thereof, namely, lies on the rotation locus of the pointed section of the engagement section 54 is engaged with said engagement section 54.

Figure 6:
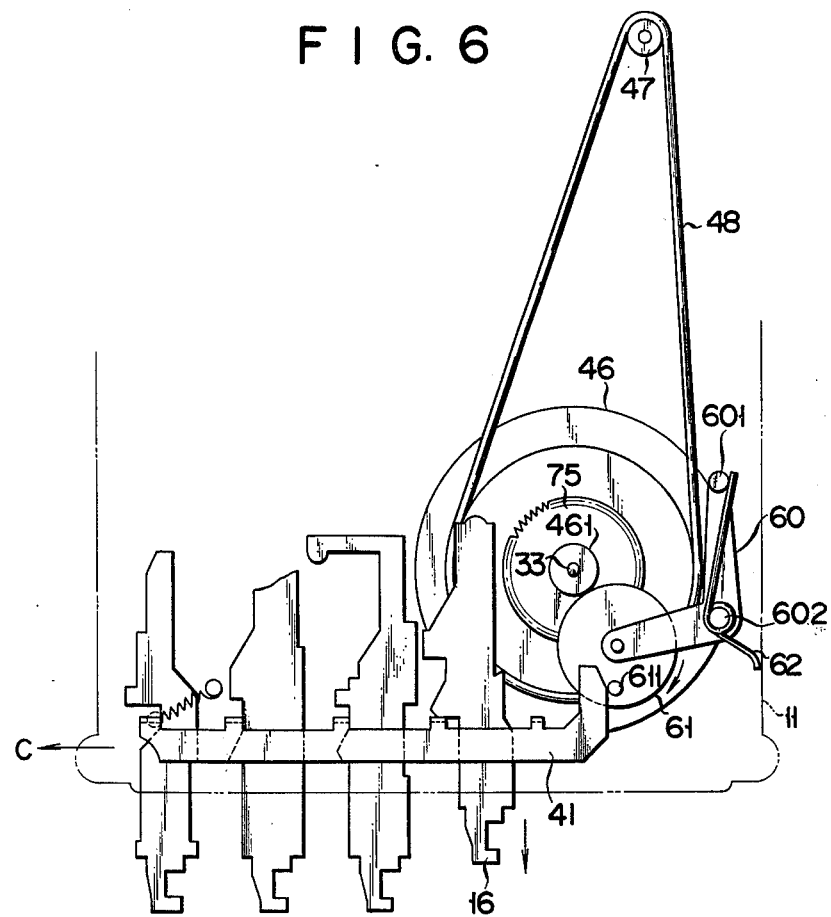
FIG. 6 is a top view of the actuation of the automatic stop mechanism of FIG. 4 relative to a lock board.

As a result, the detection lever 52 is brought downward to the lower part of FIG. 2 against the urging force of the spring 63. At this time, the inclined section 524 of the detection lever 52 abuts against the engagement protuberance 601 of the automatic tape run stop lever 60, causing this lever 60 to be rotated clockwise of FIG. 2 against the urging force of the torsion spring 62. As a result, the drive idler 61 is pressed against the idler section 461 of the flywheel 46 to be rotated clockwise of FIG. 2. When the drive idler 61 is rotated, the engagement pin 611 of said drive idler 61 strikes the lock board 41 as shown in FIG. 6, causing said lock board 41 to slide in the direction of an arrow C shown in FIG. 6. As a result, the reproducing member 16 is unlocked from the lock board 41, thereby effecting the automatic tape run stop.

Where the reproducing member 16 is unlocked, then the head chassis 20 regains a position indicated in FIG. 1. Then as seen from FIG. 4, the engagement pin 581 is pushed by the inclined section 201 of the head chassis 20, and moved in the opposite direction to that indicated by the arrow G. Eventually, the changeover lever 58 is brought back to a position indicated in FIG. 2. Therefore, immediately after the automatic stop of a tape run, the cam idler 53 is removed from the idler 64 and the idler section 461 of the flywheel 46.

Substantially the same description as given above is applicable to the operation of an automatic tape run stop mechanism for the recording mode in terms of the mechanical arrangement, except that for the recording mode, the recording member 15 and reproducing member 16 are jointly actuated. Therefore, detailed description of said operation is omitted.

Next, an automatic tape run stop mechansim for the fast forwarding and rewinding modes. Brief description is first given of the fast forwarding and rewinding mechanisms. Referring to FIG. 7, an approximately L-shaped fast forward attachment 66 is provided between the left and right reel rests 38, 39.

One end of the L-shaped fast forward attachment 66 is rotatably supported by a pivotal shaft 67 formed on the main chassis 11. A pivotal shaft 661 is provided in the angular section of the L-shaped fast forward attachment 66. An approximately rhomboidal rewind attachment 68 superposed on the fast forward attachment 66 is rotatably supported by said pivotal shaft 661. This rhomboidal rewind attachment 68 comprises two pivotal shafts 69, 70 and mutually engageable gears 71, 72 which are rotatably supported by the respective pivotal shaft 69, 70.

The left side reel rest 38 is provided with a concentric gear 73 engageable with the above-mentioned gear 71. The right side reel rest 39 is provided with a concentric gear 74 which is disposed under the idler 64 and made engageable with the aforesaid gear 72. The flywheel 46 (not shown in FIG. 7) is provided with a concentric gear 75 engageable with the previously described gear 72. As shown in FIG. 7, the rewind attachment 68 is urged by a spring 76 in the direction of an arrow I. Part of the pivotal shaft 69 of the rewind attachment 68 extends upward to be fitted into a hole (not shown) formed in the main chassis 11. The pivotal shaft 69 is pressed against the inner wall of the hole (not shown) of the main chassis 11, thereby securely setting the rewind attachment 68 in place.

An approximately L-shaped engagement attachment 171 is formed at the rear end of the rewinding member 17 for engagement with the pivotal shaft 69 of the rewind attachment 68. The forward end of the fast forward attachment 66 is provided with a protuberance 662. The rear end of the fast forwarding member 18 is provided with an inclined section 181 engageable with the protuberance 662 of the fast forward attachment 66.

Where the rewinding member 17 is pushed for actuation in the direction of an arrow indicated in FIG. 7, then the engagement attachment 171 of the rewinding member 17 rearward pushes the pivotal shaft 69 of the rewind attachment 68. As a result, the rewind attachment 68 is rotated clockwise of FIG. 7 about the pivotal shaft 661 against the urging force of the spring 76. The gears 71, 72 are respectively engaged with the gears 73, 75. The gear 75 which is rotated in the same direction as the flywheel 46, namely, counterclockwise in the direction of an arrow J indicated in FIG. 7 eventually causes the left side reel rest 38 to be rotated clockwise of FIG. 7 by means of the gear 73, thereby effecting the rewind operation of a cassette tape recorder. Where the fast forwarding member 18 is actuated, then the inclined section 181 of the fast forwarding member 18 causes the protuberance 661 of the fast forward attachment 66 to be pushed along said inclined section rearward to the right side. As a result, the fast forward attachment 66 is rotated counterclockwise of FIG. 7 about the pivotal shaft 67. The gear 72 is engaged with the gear 74 and the gear 75 which is normally rotated counterclockwise. Eventually, the right side reel rest 39 is rotated counterclockwise of FIG. 7, thereby effecting the fast forward operation.

Provided between the rewinding member 17 and fast forwarding member 18 is an automatic tape run stop member 78. This automatic tape run stop member 78 is rotatably supported by a pivotal shaft 77 mounted on the main chassis 11. One end of said automatic tape run stop member 78 is rotatably supported by the pivotal shaft 69 of the gear 71. The other end of said automatic tape run stop member 78 is provided with an inclined section 781 capable of abutting against the pivotal shaft 57 of the cam idler 53.

Where a cassette tape recorder is set for the rewind mode, the rewind attachment 68 is rotated clockwise of FIG. 7, and consequently the automatic tape run stop member 78 is rotated clockwise about the pivotal shaft 77. As a result, the inclined section 781 of the automatic tape run stop member 78 pushes the pivotal shaft 57 of the cam idler 53 to the lower of FIG. 7, causing the cam idler 53 to be pressed against only the idler section 461 of the flywheel 46.

Where the cassette tape is set for the rewind mode, then the right side reel rest 39 is rotated clockwise of FIG. 7. At this time, the friction board 49 (see FIG. 4) also tends to be rotated in the same direction as the right side reel rest 39. However, the indicated left end of the flat section 491 is pressed against the engagement section 501 of the swingable lever 50, which in turn is urged to be rotated clockwise of FIG. 4 about the pivotal pin 51. As a result, the rewind mode is carried out in the same stable manner as described with reference to FIGS. 2, 4, 5A and 5B. When the tape runs to the terminal end, the rewinding member 17 is unlocked, automatically stopping the tape run in the same manner as described with reference to FIG. 5C. After the automatic stop of the tape run, the automatic tape run stop member 78 is brought to a position shown in FIG. 7 to release the cam idler 53 from the idler section 461 of the flywheel 46.

Where the fast forward attachment 66 is rotated counterclockwise of FIG. 7 by the push of the fast forwarding member 18, then the pivotal shaft 69 of the rewind attachment 68 is moved rearward to the right side of the tape recorder, because the rewind attachment 68 is coupled to the fast forward attachment 66 by means of the pivotal shaft 661. As a result, the automatic tape run stop member 78 is rotated clockwise of FIG. 7 about the pivotal shaft 77, causing the cam idler 53 to be pressed against only the idler section 461 of the flywheel 46. When the tape runs to the terminal end, then the fast forwarding member 18 is unlocked as in the case of the rewind mode, thereby effecting the automatic stop of the tape run. After the automatic stop of the tape run, the cam idler 53 is removed from the idler section 461 of the flywheel 46.

Now, reference is made to the operation of a mechanism for automatically stopping a tape run at the actuation of the pause member 19. The pause member 19 is actuated, while a tape is running at a prescribed speed for the record or reproducing mode as shown in FIG. 4. At this time, a bent attachment 191 (see FIG. 2) formed at the rear end of the pause member 19 causes the rightward projecting arm 583 of changeover lever 58 extending up to the right lateral wall of the main chassis 11 to be push rearward of FIG. 4. As a result, the cam idler 53 is removed from the idler 64 of the right side reel rest 39 and the idler section 461 of the flywheel 46. Therefore, the rotation moment of the flywheel 46 ceases to be transmitted to the right side reel rest 39, effecting the temporary stop of the tape run.

Where, while the reproducing member 16 is actuated, the fast forwarding member 18 is further actuated, then the tape recorder is set for the reproducing-fast forwarding mode (cue mode). At this cue mode, the fast forward of a cassette tape can be effected, while a sound recorded in the tape is reproduced. Under such condition, the fast forwarding member 18 is not locked to the lock board 41. Where, therefore, the fast forwarding member 18 is unactuated at a given time, then the tape recorder resumes the reproducing mode. The above-mentioned mechanical arrangement is made possible, because the lengths $l_1$, $l_2$, $l_3$ of the engagement sections 161, 172, 182 of the lock board 41 to which the reproducing, rewinding and fast forwarding members 16, 17, 18 are locked have the following relationship as shown in FIG. 2:

$$l_1 > l_2, l_1 > l_3$$

Where the fast forwarding member 18 is actuated while the reproducing member 16 is in operation, then the lock board 41 (FIG. 2) is normally urged in the direction of the arrow D by the urging force of a spring (not shown). The reproducing member 16 is normally urged forward by the spring 44. Therefore, the lock board 41 is moved in the direction of the arrow C by the length $l_3$ of the engagement section 182 of the fast forwarding member 18. The lock board 41 retains said moved position by the urging force of the spring 44 due to frictional engagement between the lock board 41 and reproducing member 16. In other words, the fast forwarding member 18 remains in an unlocked state.

The above-mentioned description is also applicable to the reproducing-rewinding mode (review mode) of the tape recorder in which the rewinding member 17 is actuated during the reproducing mode. During the cue or review mode, the cam idler 53 is eventually pressed against the idler section 461 of the flywheel 46, thereby effecting the automatic stop of the tape run.

With the automatic stop mechanism of this invention described above, the cam idler 53 is pressed against the idler section 461 of the flywheel 46 and the idler 64 of the right side reel rest 39. Where the cassette tape runs at a high speed for the fast forward or rewind mode, then the cam idler 53 is allowed to abut against only the idler section 461 of the flywheel 46. Therefore, the run of the cassette tape can be automatically stopped safely and reliably, whether the tape runs at a high or low speed.

After the automatic stop of the cassette tape running quickly or slowly, the cam idler 53 and the idler section 461 of the flywheel 46 are disengaged from each other, exerting no harmful effect on the succeeding operation of the cassette tape recorder for any selected mode.

Figure 8A:
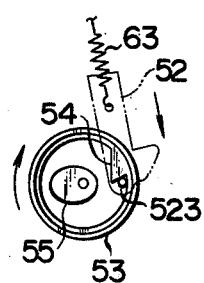
FIGS. 8A and 8B are top views showing detection levers of different states.
Figure 8B:
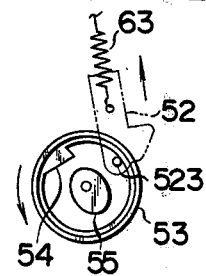

Description is now given of the operation of the engagement section 54 (FIGS. 5A, 5B, 5C) of the cam idler 53 and the detection pin 523 of the automatic tape run stop detection lever 52. Where the tape runs to the terminal end, then the detection pin 523 of the tape run stop detection lever 52 is engaged, as shown in FIG. 8A, with the engagement section 54 of the cam idler 53, causing said detection lever 52 to be pulled forward against the urging force of the spring 63. Where any of the operation members 15, 16, 17, 18 is released as a result, then the cam idler 53 is removed from the idler section 461 of the flywheel 46 and brought to a freely rotatable state unobstructed by any external force. As seen from FIG. 8B, therefore, the tape run stop detection lever 52 is pulled rearward by the urging force of the spring 63. At this time, the detection pin 523 of the tape run stop detection lever 52 still remains engaged with the engagement section 54 of the cam idler 53. Therefore, the detection pin 523 of the tape run stop detection lever 52 pushes the engagement section 54 of the cam idler 53, which in turn is rotated counterclockwise as shown in FIG. 8B. This counterclockwise rotation gives rise to the instant removal of the cam idler 53 from the idler section of the flywheel 46, that is, the free state of said cam idler 53. Therefore, the urging force of the spring 63 is immediately applied to the tape run stop detection lever 52, thereby causing the cam idler 53 to be rotately forcefully. Therefore, the detection pin 523 of the tape run stop detection lever 52 is set fully apart from the engagement section 54 of the cam idler 53. Where, therefore, the cassette tape recorder is set for any succeeding operation mode, it is unnecessary to provide an extra device for disengaging the detection pin 523 of the tape run stop detection lever 52 from the engagement section 54 of the cam idler 53, thus offering great advantage. Since, further, the cam idler 53 is rotated in the opposite direction to that in which said cam idler 53 is rotated by means of the idler section 461 of the flywheel 46, the detection pin 523 of the tape run stop detection lever 52 can be unfailingly disengaged from the engagement section 54 of the cam idler 53, thereby preventing the automatic tape run stop mechanism from being erroneously operated.

There will now be described the condition in which the pivotal shaft 57 of the cam idler 53 is pushed by the inclined section 781 of the automatic tape run stop member 78 previously described with reference to FIG. 7. This automatic tape run stop member 78 is intended to move the tape run stop detection lever 52 by utilizing the force of the cam idler 53 rotating in contact with the idler section 461 of the flywheel 46. Therefore, said automatic tape run stop member 78 should be so designed as to ensure the transmission without loss of a rotation moment from the idler section 461 of the flywheel 46 to the cam idler 53.

To this end, it is advised to cause a perpendicular line I extending from the center of the pivotal shaft 57 of the cam idler 53 to the inclined section 781 of the automatic tape run stop member 78 to define the following angle $\theta_1$ with a line II drawn from the center of said pivotal shaft 57 to the center of the idler section 461 of the flywheel 46:

$$90° < \theta_1 < 180°$$

Figure 9A:
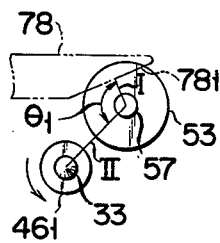
FIGS. 9A and 9B are schematic top views respectively showing angles at which a cam idler abuts against a flywheel idler.
Figure 9B:
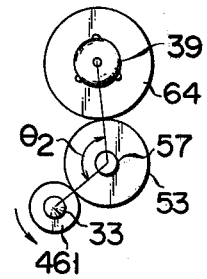

The term $\theta_1 < 180°$ of the above equation is a maximum requisite condition for causing the angle $\theta_1$ to function as an engagement angle. The term $\theta_1 > 90°$ is a minimum requisite condition for preventing the angle $\theta_1$ from acting as a nonengagement angle. If the angle $\theta_1$ is designed to fall within the above-defined range, then the cam idler 53 can be pressed against the idler section 461 of the flywheel 46 in the direction in which the angle $\theta_1$ acts as an engagement angle relative to the rotating direction of said idler section 461, thereby enabling the rotation moment of the idler section 461 of the flywheel 46 to be reliably transmitted to the cam idler 53 without loss. Also, an angle $\theta_2$, which is defined, as shown in FIG. 9B, by a line extending between the center of the right side reel rest 39 and the center of the pivotal shaft 57 of the cam idler 53 when said cam idler 53 is pressed against the idler 64 with a line extending between the center of said pivotal shaft 57 and the center of the capstan 33, should be chosen to be equal to the above mentioned angle $\theta_1$.

It is experimentally proved that if the above-mentioned angle $\theta_1$, $\theta_2$ are chosen to range as follows:

$$110° < \theta_1 < 130°, 110° < \theta_2 < 130°$$

then the most ideal effect can be ensured.

Figures 10A, 10B, 10C:
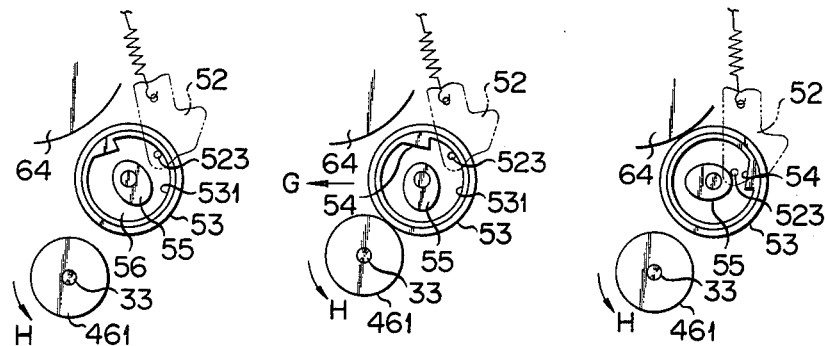
FIGS. 10A, 10B and 10C are schematic top views showing the actuated state of the automatic stop mechanism when a pause mechanism is put into operation.

A member which pushes the pivotal shaft 57 of the cam idler 53 to cause said cam idler 53 to be pressed against the idler section 461 of the flywheel 46 need not be the aforesaid automatic tape run stop member 78. Obviously, any member well serves the purpose, provided it can be jointly moved with any operation member for the high speed tape run.

Where the pause member 19 is actuated while the cassette tape is running for the reproducing mode, then the cam idler 53 is removed, as shown in FIG. 10A, from the idler 64 of the right side reel rest 39 and the idler section 461 of the flywheel 46. Since, at this time, the right side reel rest 39 ceases to be rotated, the tape run stop detection lever 52 is not supplied with such an urging force as causes the detection pin 523 of said detection lever 52 to be pressed against the rotary cam 55. As a result, the detection pin 523 remains in a given position in a space defined between the inner wall of a through hole 531 opened in the cam idler 53 and the outer peripheral wall of the rotary cam 55.

Now let it be assumed that where, under the condition of FIG. 10A, the pause member 19 is released to regain the original position, then the cam idler 53 is first pressed against the idler section 461 of the flywheel 46 as shown in FIG. 10B.

Since, at this time, the flywheel 46 is rotated counterclockwise in the direction of an arrow H indicated in FIG. 10B, the cam idler 53 pressed against the idler section 461 of the flywheel 46 is rotated clockwise. At this time, however, the tape run stop detection lever 52 is not supplied with such an urging force as causes the detection pin 523 of said detection lever 52 to be pressed against the rotary cam 55, and the cam idler 53 is pressed against the idler section of the flywheel 461 and is moved in the direction of an arrow G indicated in FIG. 10B. Therefore, the detection pin 523 is correspondingly shifted from its previous given position in the aforesaid space 56 and located on that part of the inner wall of the through hole 531 of the cam idler 53 which lies remotest from the pivotal shaft of said cam idler 53.(FIG. 10B). As a result, the detection pin 523 of the tape run stop detection lever 52 is engaged with the engagement section 54. With the prior art automatic tape run stop mechanism, therefore, the difficulties arose that the detection pin 523 of the tape run stop detection lever 52 was engaged with the engagement section 54 of the cam idler 53, and the automatic tape run stop was carried out immediately after the release of the pause member 19. To eliminate the above-mentioned difficulties, therefore, the automatic stop mechanism of this invention is so arranged that where the pause member 19 is actuated and thereafter released, the cam idler 53 is first pressed against the idler 64 of the right side reel rest 39 and then against the idler section 461 of the flywheel 46. In other words, as seen from FIGS. 1 and 2, the movement of the changeover lever 58 rotatably supporting the cam idler 53 to the indicated right and left sides is defined by the length of the elongate hole 112 which is formed in the main chassis 11 and into which the engagement pin 581 mounted on the arm 585 of the changeover lever 58 is loosely inserted. The elongate hole 112 is inclined upward on the left side, as seen from FIG. 2, to a horizontal line at a prescribed angle.

Where, as shown in FIG. 10C, the cam idler 53 is first pressed against the idler 64 of the right side reel rest 39, then the cam idler 53 abuts against the idler section 461 of the flywheel 46. Where, at this time, the rotation moment of the flywheel 46 is transmitted to the idler 64 of the right side reel rest 39 by means of the cam idler 53, then the tape run stop detection lever 52 is so urged as to cause the detection pin 523 to be pressed against the rotary cam 55. As a result, the cassette tape recorder can be set for a stable reproducing mode without giving rise to engagement between the engagement section 54 and engagement pin 523, thereby preventing the erroneous actuation of the automatic stop mechanism.

As seen from FIGS. 10A and 10B, the engagement pin 523 is set fully apart from the engagement section 54 by the operation described with reference to FIG. 8B. With an automatic stop mechanism embodying this invention, the cam idler 53 may perchance be pressed against the idler section 461 of the flywheel 46 for just a short period. Even in this case, the same effect of preventing the erroneous actuation of the automatic stop mechanism as described with reference to FIG. 10C is ensured by taking the steps of urging the tape run stop detection lever 52 by the rotation of the right side reel rest 39 before engagement between the engagement section 54 and the detection pin 523 of said detection lever 52 resulting from the rotation of the cam idler 53, and causing said detection lever 52 to be rotated clockwise of FIG. 10C, thereby letting the detection pin 523 fall outside of the rotation locus of the pointed section of the engagement section 54. In other words, it may be regarded as practically advisable for the above-mentioned object to let the cam idler 53 be pressed against the idler 64 of the right side reel rest 39 and the idler section 461 of the flywheel 46 substantially at the same time. A period extending from the point of time at which the cam idler 53 is pressed against the idler 64 of the right side reel rest 39 to the point of time at which said cam idler 53 abuts against the idler section 461 of the flywheel 46 is considered sufficient, if it ranges between −0.05 second and 0.1 second. This fact offers great advantage to a manufacturer of a tape recorder in view of errors allowable for manufacture.

Figures 11A, 11B, 11C:
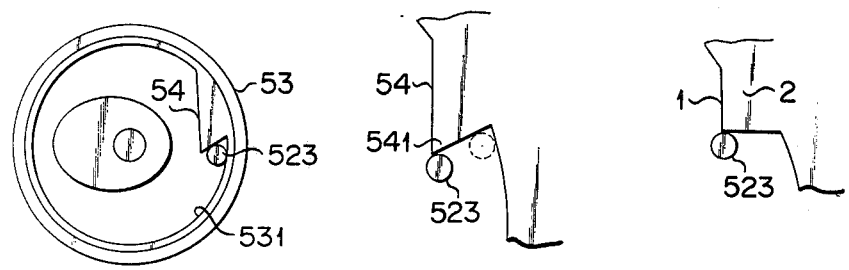
FIGS. 11A, 11B and 11C are schematic plan views indicating the manners in which an engagement section of the cam idler is engaged with a detection pin.

The detection pin 523 of the automatic tape run stop detection lever 52 engaged with the engagement section 54 of the cam idler 53 is clamped, as shown in FIG. 11A, between that part of the inner peripheral wall of the through hole 531 which lies remotest from the center of the pivotal shaft 57 of the rotary cam 53 and the inclined plane of the engagement section 54 which faces said remotest part of the inner peripheral wall of the through hole 531. An angle defined by the inclined plane of the engagement section 54 with that part of the inner peripheral wall of the through hole 531 is chosen to be small than 90°.

In contrast, the engagement section 1 of the prior art automatic tape run stop detection mechanism is shaped as shown in FIG. 11C. Where, therefore, the detection pin 523 of the automatic tape run stop detection lever 52 is engaged with said engagement section 1 in a position indicated in FIG. 11C, then the prior art automatic tape run stop detection mechanism has the drawbacks that the detection pin 523 easily comes off the engagement section 1, readily resulting in the erroneous actuation of the prior art automatic tape run stop detection mechanism, and that since the detection pin 523 is engaged with the engagement section 54 at a point remotest from the outer peripheral wall of the cam idler 2, thereby preventing the detection pin 523 from being supplied with a sufficiently great drive force. Where, therefore, the engagement section 54 is shaped as previously described in accordance with the present invention, then the detection pin 523 can be carried to a position indicated in a dotted line in FIG. 11B, even if the detection pin 523 is initially pressed against the pointed part 541 of the engagement section 54, thus ensuring engagement between the detection pin 523 and engagement section 54. Further where the detection pin 523 takes the position indicated in a dotted line in FIG. 11B, then a greater torque moment can be produced to drive the detection pin 523 to the lower part of FIG. 11B than when the detection pin 523 is located in a position shown in a solid line in FIG. 11B. The reason for this is that since the cam idler 53 is driven while that part of the outer peripheral wall of said cam idler 53 which lies remotest from the center of the pivotal shaft 57 of said cam idler 53 is pressed against the idler section 461 of the flywheel 46, the detection pin 523 is supplied with a greater drive force when said detection pin 523 is engaged with the engagement section 54 at a point near said remotest part of the outer peripheral wall of the cam idler 53.

With the foregoing embodiment, two levers, that is, the swingable lever 50 and detection lever 52 were used to detect the stop of the rotation of the right side reel rest 39. However, a single lever well serves the purpose. FIG. 12 shows a modification of the automatic stop mechanism of this invention in which the swingable lever 50 and detection lever 52 is formed into an integral body. An engagement section 791 is projectively formed to face the flat section 491 of the friction board 49 concentrically mounted on the right side reel rest 39 (not shown in FIG. 12). A tape run stop detection lever 79 which has the engagement section 791 is provided in a state rotatably supported by a pivotal shaft 80 mounted on the main chassis 11 at the upper part of FIG. 12. An elongate hole 794 is formed at the rear end part of the tape run stop detection lever 79. The pivotal shaft 80 is loosely inserted into said elongate hole 794. The tape run stop detection lever 79 is arranged to move along said elongate hole 794.

The lower end part (as shown in FIG. 12) of the tape run stop detection lever 79 comprises an engagement section 792 engageable with an engagement protuberance 601 of the automatic tape run stop detection lever 60 and a detection section 793 whose outer end is provided with a detection pin 81. This detection pin 81 is loosely inserted into a space 85 defined between the inner wall of a through hole 821 formed in a slightly eccentric relationship to the center of a cam idler 82 and a rotary cam 84 which is provided in said through hole 821 and at one end of which an engagement section 83 is formed. Like the previously described cam idler 53, the cam idler 82 is rotatably fitted to a changeover lever (not shown in FIG. 12) by means of a pivotal shaft 86 of said cam idler 82.

Where the tape recorder is set for the reproducing mode, then the cam idler 82 is pressed, as shown in FIG. 12, against the idler 64 of the right side reel rest 39 and the idler section 461 of the flywheel 46. As a result, the idler 64 of the right side reel rest 39 is rotated in the direction of an arrow J indicated in FIG. 12. Though, at this time, the friction board 49 tends to be rotated in the same direction, yet the right end of the flat section 491 of said friction board 49 is pressed against the engagement section 791 of the tape run stop detection lever 79 and pushes said engagement section 791. Eventually, therefore, the tape run stop detection lever 79 is rotated clockwise of FIG. 12. Accordingly, the detection pin 81 of the tape run stop detection lever 79 is pressed against the inner peripheral wall of the through hole 821 of the cam idler 82, and consequently is not engaged with the engagement section 83 of the rotary cam 84. Where, under this condition, the cassette tape runs to the terminal end and the friction board 49 does not urge the tape run stop detection lever 79 for its clockwise rotation as viewed from FIG. 12, then the detection pin 81 slides along the inner wall of the through hole 821 of the cam idler 82 and is brought to rest at that part of the inner wall of the through hole 821 which lies nearest to the pivotal shaft 86 of the cam idler 82. At this time, the engagement section of the rotary cam 84 is engaged with the detection pin 81. Consequently, the whole tape run stop detection lever 79 is moved along the elongate hole 794, that is, rearward to the right side. At this time, the tape run stop detection section 792 of said detection lever 79 is engaged with the engagement protuberance 601 of the automatic tape run stop lever 60, which in turn is rotated clockwise of FIG. 12, thereby effecting the automatic stop of the tape run.

As mentioned above, the automatic stop mechanism of this invention can be properly actuated, whether the single tape run stop detection lever 79 is used, or the aforesaid swingable lever 50 and detection lever 52 are applied. However, the use of said swingable lever 50 and detection lever 52 allows for their easy and smooth movement with a broader latitude.

Figure 13A:
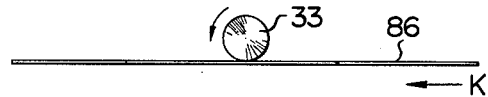
FIGS. 13A and 13B are schematic top views showing the manner in which a statically charged cassette tape is wound about a capstan.
Figure 13B:
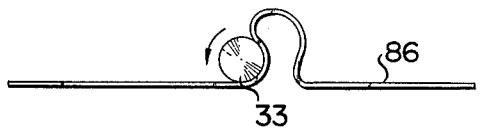

A cassette tape recorder whose mechanical parts are prepared from plastics material has raised the problem that an electrostatic energy tends to be accumulated in a cassette tape. Where the stop-eject member 13 of FIG. 1 is actuated to stop the cassette tape 86 while it is running in the direction of an arrow J in contact with the capstan 33 as shown in FIG. 13A, then the flywheel 46 still continues rotation due to its inertia. Accordingly, the capstan 33 concentrically mounted on the flywheel 46 also continues rotation. Where, in this case, an electrostatic energy is accumulated in the cassette tape 86, then an undesirable event takes place, for example, the cassette tape 86 is electrostatically attracted to the capstan 33 to be wound thereabout as shown in FIG. 13B.

To avoid the above-mentioned drawback, therefore, a brake lever 88 is fitted, as shown in FIG. 14A, to a switch slider 42. This brake lever 88 is formed approximately like an L-shape, and is fitted with a brake shoe 87 at one end. The angular section of said brake lever 88 is rotatably supported by a pivotal shaft 421 mounted on the switch slider 42. A spring 89 fitted to the other end of the brake shoe 87 urges the brake lever 88 to rotate it counterclockwise of FIG. 14A. Where any of the operation members 15, 16, 18, 17 of the recording, reproducing, fast forwarding and rewinding members is not actuated, the brake shoe 87 is pressed against the flywheel 46 by the urging force of the spring 89.

Where, under this condition, the rewinding member 17 is actuated, then the switch slider 42 is moved in the direction of an arrow indicated in FIG. 4B, causing the brake shoe 87 to be removed from the flywheel 46. At this time, the brake lever 88 is rotated counterclockwise by the urging force of the spring 89, until a bent attachment 881 formed at the angular part of the brake lever 88 is pressed against one lateral wall of the switch slider 42.

Where the stop-eject member 13 is actuated to release the rewinding member 17 to its original position, then the brake shoe 87 is again pressed against the flywheel 46 as shown in FIG. 14A, thereby stopping the inertial rotation of the flywheel 46. Even, where, therefore, an electrostatic energy is accumulated in the cassette tape 86 as previously described, it is possible to resolve the difficulty that the cassette tape 86 is electrostatically wound about the capstan 33.

This invention is not limited to the foregoing embodiments, but may be practised in various modifications without departing from its object.

What is claimed is:
1. A tape recorder comprising:
a chassis;
a motor supported by said chassis;
a first operation member on said chassis and operable to set tape recorder to a slow tape run mode and movable between an operation position and a non-operation position;
a second operation member on said chassis and operable to set the tape recorder to a fast tape run mode and movable between an operation position an non-operation position;
a first rotary member rotatably supported by the chassis and rotated by the motor and operable to effect the run of a tape when the first or second operation member is locked in an operation position;
a second rotary member rotatably attached to the chassis and adapted to rotate while the tape runs and brought to rest when the tape run is stopped;

a third rotary member rotatably attached to the chassis, said third rotary member being movable relative to the chassis and into engagement with the first and second rotary members in response to the locking of the first operation member in the operation position to cause the second rotary member to be rotated, and said third rotary member being movable relative to said chassis to disengage from the operation position to cause the third rotary member to be disengaged from the second rotary member, said third rotary member including an engagement section rotatable therewith;

a tape run stop detection mechanism for detecting the stop of the tape run and operable to take action corresponding to said detection, said tape run stop detection mechanism including a movable means provided with an engagement member which is urged in one direction by the rotation of the second rotary member to prevent engagement of said tape run stop detection mechanism with said engagement section, said engagement member being operable to engage with said engagement section at the stop of the second rotary member, said movable means being movable in another direction resulting from the engagement between said engagement member and engagement section and the rotation of the third rotary member, and an urging member for producing at the movement of said movable means an urging force acting in a direction opposite to that which results from said engagement between said engagement member and engagement section, whereby the tape run stop detection mechanism takes the action of moving the movable means in the direction resulting from said engagement between said engagement member and engagement section when the mechanism detects the stop of the tape run;

a release mechanism for unlocking said first or second operation member from its respective operation position when the tape run stop detection mechanism takes said action, said release mechanism being connected with said tape run stop detection mechanism and operable in response to movement of said movable means in the direction resulting from the engagement between said engagement member and engagement section.

2. The tape recorder according to claim 1, wherein said third rotary member is moved to disengage from the first rotary member in response to unlocking of the first operation member by the release mechanism from the operation position.

3. The tape recorder according to claim 1, wherein said third rotary member is moved into engagement with the first rotary member in response to locking of said second operation member in the operation position and is moved to disengage from the first rotary member in response to unlocking of the second operation member by the release mechanism from the operation position.

4. The tape recorder according to claim 3, wherein the second rotary member is provided with a fourth rotary member which is rotated in frictional engagement with said second rotary member, said fourth rotary member having a flat section which is pressed against the movable means to urge said movable means in said one direction.

5. The tape recorder according to claim 4, wherein the tape run stop detection mechanism comprises an eccentric rotary member which is mounted on the third rotary member and is rotated therewith in eccentric relationship to the rotation of said third rotary member; and the engagement member mounted on the movable means is urged in said one direction by the rotation of the second rotary member and is pressed against the peripheral wall of the eccentric rotary member.

6. The tape recorder according to claim 2, wherein said third rotary member is moved into engagement with the first rotary member in response to locking of said second operation member in the operation position and is moved to disengage from the first rotary member in response to unlocking of the second operation member by the release mechanism from the operation position.

7. The tape recorder according to claim 6, wherein the second rotary member is provided with a fourth rotary member which is rotated in frictional engagement with said second rotary member, said fourth rotary member having a flat section which is pressed against the movable means to urge said movable means in said one direction.

8. The tape recorder according to claim 7, wherein the tape run stop detection mechanism comprises an eccentric rotary member which is mounted on the third rotary member and is rotated therewith in eccentric relationship to the rotation of said third rotary member; and the engagement member carried by the movable means is urged in said one direction by the rotation of the second rotary member and is pressed against the peripheral wall of the eccentric rotary member.

9. The tape recorder according to any of preceding claims 1 through 8 wherein the engagement section is formed to urge the engagement member mounted on the movable member for engagement at a maximum torque moment.

10. The tape recorder according to claim 9, wherein an angle defined between that plane of the engagement section which is engageable with the engagement member and the peripheral wall of the third rotary member on which said engagement section is formed is less than 90°.

11. The tape recorder according to claim 10, wherein when the first operation member is pushed for actuation, a line extending between the rotation center of the second rotary member and the rotation center of the third rotary member defines an angle $\theta_2$ chosen to fall within the following range with a line extending between the rotation center of the first rotary member and the rotation center of the third rotary member:

$$90° < \theta_2 < 180°.$$

12. The tape recorder according to claim 11, wherein said angle $\theta_2$ is chosen to fall within the following range:

$$110° < \theta_2 < 130°.$$

13. A tape recorder comprising:
a chassis;
a motor supported by said chassis;
a first operation member on said chassis and operable to set the tape recorder to a slow tape run mode and movable between an operation position and a non-operation position;
a second operation member on said chassis and operable to set the tape recorder to a fast tape run mode and movable between an operation position and a non-operation position;

a first rotary member rotatably supported by the chassis and rotated by the motor and operable to effect the run of a tape when the first or second operation member is locked in an operation position;

a second rotary member rotatably attached to the chassis and adapted to rotate while the tape runs and brought to rest when the tape run is stopped;

a third rotary member rotatable relative to the chassis, said third rotary member being rotatably supported on a changeover member which is movable relative to said chassis, said changeover member being movable to cause the third rotary member to be engaged with the first rotary member and second rotary member in response to the locking of the first operation member in the operation position to cause the second rotary member to be rotated, said changeover member being movable to disengage the third rotary member from the second rotary member in response to unlocking of the first operation member by a release mechanism from the operation position, said third rotary member including an engagement section rotatable therewith;

a tape run stop detection mechanism for detecting the stop of the tape run and operable to take an action corresponding to said detection, said tape run stop detection mechanism including a movable means provided with an engagement member which is urged in one direction by the rotation of the second rotary member to prevent engagement of said tape run stop detection mechanism with said engagement section, said engagement member being operable to engage with said engagement section at the stop of the second rotary member, said movable means being movable in another direction resulting from the engagement between said engagement member and engagement section and the rotation of the third rotary member, and an urging member for producing at the movement of said movable means an urging force acting in a direction opposite to that which results from said engagement between said engagement member and engagement section, whereby the tape run stop detection mechanism takes the action of moving the movable means in the direction resulting from said engagement between said engagement member and engagement section when the mechanism detects the stop of the tape run;

a release mechanism for unlocking the first or second operation member from the operation position when the tape run stop detection mechanism takes said action, said release mechanism being connected with said tape run stop detection mechanism and operable in response to movement of said movable means in the direction resulting from the engagement between said engagement member and engagement section.

14. The tape recorder according to claim 13, wherein said changeover member is movable to disengage the third rotary member from the first rotary member in response to unlocking of the first operation member by the release mechanism from the operation position.

15. The tape recorder according to claim 13, wherein the changeover member is movable to cause the third rotary member to be engaged with the first rotary member in response to locking of the second operation member in the operation position, and is movable to cause the third rotary member to be disengaged from the first rotary member in response to unlocking of the second operation member by the release mechanism from the operation position.

16. The tape recorder according to claim 15, which further comprises a swingable member having an engagement plane, which, at the actuation of the second operation member, urges the changeover member in such a direction as to cause the third rotary member to be coupled to the first rotary member.

17. The tape recorder according to claim 16, wherein, when the second operation member is moved to the operation position, a perpendicular line drawn from the rotation center of the third rotary member to the engagement plane of the swingable member defines an angle $\theta_1$ chosen to fall within the following range with a line extending between the rotation centers of the first and second rotary members:

$$90° < \theta_1 < 180°.$$

18. The tape recorder according to claim 17, wherein said angle $\theta_1$ is chosen to fall within the following range:

$$110° < \theta_1 < 130°.$$

19. The tape recorder according to claim 14, wherein the changeover member is movable to cause the third rotary member to be engaged with the first rotary member in response to locking of the second operation member in the operation position, and is movable to cause the third rotary member to be disengaged from the first rotary member in response to unlocking of the second operation member by the release mechanism from the operation position.

20. The tape recorder according to claim 19, which further comprises a swingable member having an engagement plane, which, at the actuation of the second operation member, urges the changeover member in such a direction as to cause the third rotary member to be coupled to the first rotary member.

21. The tape recorder according to claim 20, wherein, when the second operation member is moved to the operation position, a perpendicular line drawn from the rotation center of the third rotary member to the engagement plane of the swingable member defines a angle $\theta_1$ chosen to fall within the following range with a line extending between the rotation centers of the first and second rotary members:

$$90° < \theta_1 < 180°.$$

22. The tape recorder according to claim 21, wherein said angle $\theta_1$ is chosen to fall within the following range:

$$110° < \theta_1 < 130°.$$

23. The tape recorder according to any of preceding claims 13 through 22 which further comprises a third operation member which can be actuated to temporarily stop the cassette tape recorder; and a release mechanism which, at the actuation of said third operation member, moves the third rotary member away from the first rotary member, and wherein, when the third operation member is unactuated, the third rotary member is coupled to the first and second rotary members substantially at the same time.

24. The tape recorder according to claim 23, wherein, when the third operation member is unactuated, the third rotary member is coupled to the second rotary member before said third rotary member is coupled to the first rotary member.

* * * * *